(12) United States Patent
Mac Farland

(10) Patent No.: US 6,213,534 B1
(45) Date of Patent: Apr. 10, 2001

(54) CLOSURE MECHANISM FOR THE TOPS OF VEHICLES

(75) Inventor: David Mac Farland, UnterschleiBheim (DE)

(73) Assignee: Dura Convertible Systems GmbH, Cologne (DE)

( * ) Notice: Subject to any disclaimer, the term of this patent is extended or adjusted under 35 U.S.C. 154(b) by 0 days.

(21) Appl. No.: 09/333,370

(22) Filed: Jun. 15, 1999

(30) Foreign Application Priority Data

Jun. 16, 1998 (EP) .................................................. 98110982

(51) Int. Cl.⁷ .................................................. B60J 7/185
(52) U.S. Cl. ...................... 296/121; 292/33; 292/341.16; 292/DIG. 5
(58) Field of Search ...................... 296/121; 292/DIG. 5, 292/341.15, 341.16, 33

(56) References Cited

U.S. PATENT DOCUMENTS

| | | | |
|---|---|---|---|
| 2,111,687 | * 3/1938 | Webb | 292/33 |
| 2,411,945 | * 12/1946 | Vigmostad et al. | 292/DIG. 5 |
| 2,560,459 | * 7/1951 | Lundberg et al. | 292/DIG. 5 |
| 3,296,742 | 1/1967 | Mortimer | 49/319 |
| 4,101,161 | * 7/1978 | Currall | 292/DIG. 5 |
| 5,595,407 | * 1/1997 | Ter Horst | 292/DIG. 5 |

FOREIGN PATENT DOCUMENTS

| | | |
|---|---|---|
| 0 337 983 A1 | 10/1989 | (EP) . |
| 0 430 425 A2 | 6/1991 | (EP) . |
| 0 657 607 A1 | 6/1995 | (EP) . |
| 20274 | * 9/1898 | (GB) ..................................... 292/33 |

\* cited by examiner

Primary Examiner—Dennis H. Pedder
(74) Attorney, Agent, or Firm—Gardner, Carton & Douglas

(57) ABSTRACT

The present invention relates to a locking device for motor vehicle folding tops with a first connecting device (3) which, for the fixing of the folding top (9) to the motor vehicle, has a first closing mechanism with at least one second connecting device (5), which is positioned at an interval from the first connecting device (3) and a plug-like element (7), as well as a guiding element (85) suitable for the mounting of the plug-like element (7). The locking device is distinguished through the fact that the second connecting device (5) has a connecting device for the temporary locking of the plug-like element in the guiding element, and that the second locking device is connected with the closing mechanism in such a manner that, upon the fixing of the first closing mechanism into its closing position, the locking of the plug-like element (7) takes place at the same time.

17 Claims, 4 Drawing Sheets

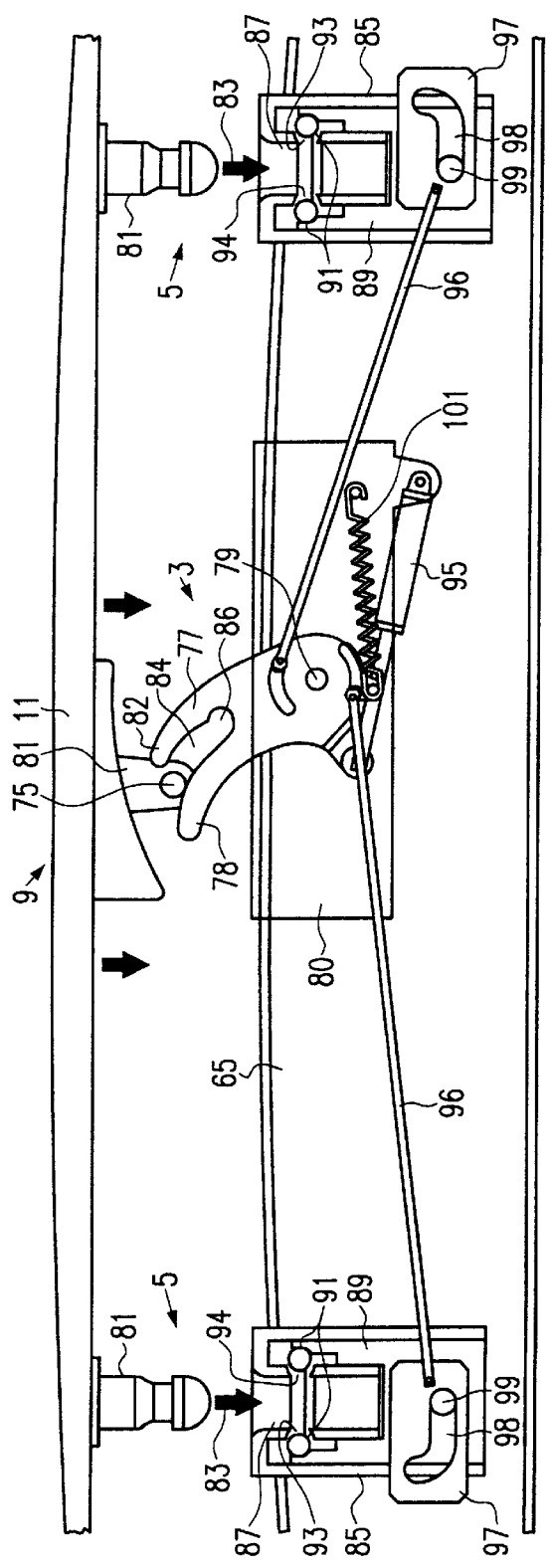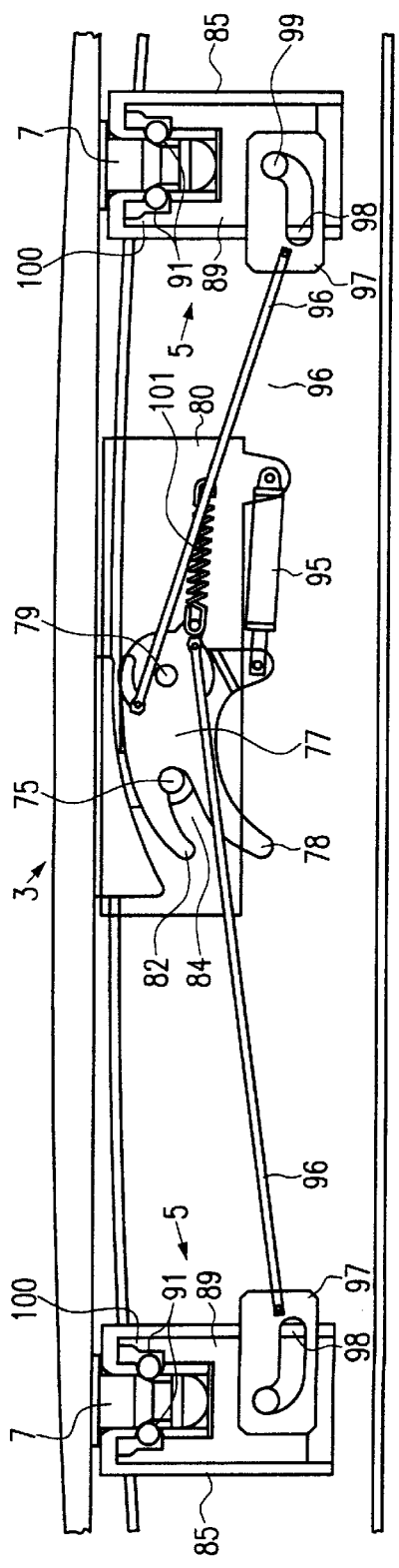

CLOSURE MECHANISM FOR THE TOPS OF VEHICLES

DESCRIPTION

Figure 1:
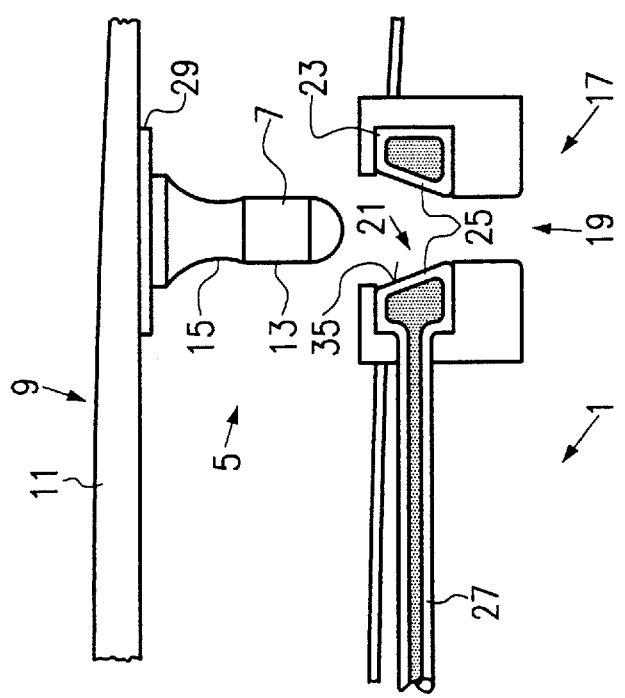
Figure 1:
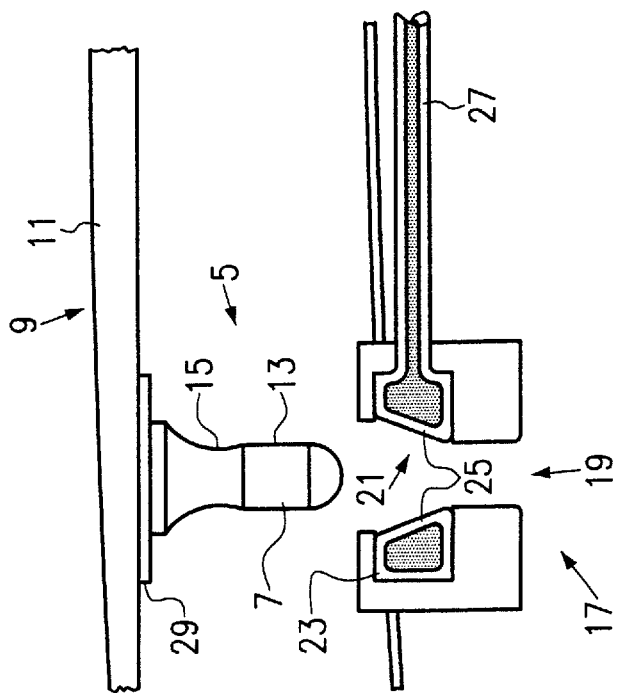

The present invention relates to a locking device for motor vehicle folding tops in accordance with the introductory portion of claim 1.

Motor vehicle folding tops in the form of foldable tops or hard tops are, as a rule, supported in the rear area of the motor vehicle and can be swivelled on this, whereby they can be folded or swivelled from a closed position of the folding top into an open position.

Folding tops have, as a general rule, a frontal, transversely-proceeding front support unit or a corresponding reinforcement device and are, for the placement of the cover, fixed to the wind cowl of the windshield of the motor vehicle.

Corresponding connecting devices for fixing are provided for this purpose. A locking device of the conventional state of the art has a first connecting device which has a first closing mechanism for the fixing of the folding top to the motor vehicle, and additionally has at least one second connecting device which is positioned at a distance from the first connecting device, and also has a plug-like element as well as a guide element which is suited for the accommodation of the plug-like element.

In the locking device in accordance with the state of the art, the second connecting device serves only for the guiding of the plug-like element, and the first connecting device makes possible the connecting of the folding top or the hard top to the motor vehicle.

It is disadvantageous in this connection that, because of the connection to only one point, an effective and particularly tightly sealed connection of the folding top to the motor vehicle is only provided to an insufficient degree in the area of the upper edge of the windshield, as the result of which, because of the air pressure which is brought about, the folding top can be raised again and a correspondingly large air gap can be brought about, especially at high speeds, which allows the outside air to penetrate unimpeded, and this is particularly disadvantageous, especially during bad weather, such as rain or snow.

The task of creating a locking device for motor vehicle folding tops which overcomes the disadvantages which have been noted above, and which guarantees a secure sealing of the folding top, particularly also at high speeds of the motor vehicle, therefore forms the basis for the present invention.

This task is solved through the characteristics of claim 1.

Through the fact that the second connecting device has a locking device for the temporary locking of the plug-like element in the guide element, and that the second locking device is connected with the closing mechanism in such a manner that, upon the fixing of the first closing mechanism in its closed position, the locking of the plug-like element takes place at the same time, it is brought about that the folding top is securely fixed at at least two points, and a tightly-sealed securing of the position of the folding top to the motor vehicle at the area of the forward edge of the folding top is consequently made possible.

The raising of the forward edge of the folding top at high speeds is, in particular, thereby prevented, and a tightly-sealed placement of the folding top to the wind cowl in the area of the upper edge of the windshield is brought about, so that the air gap which has previously disadvantageously come about is prevented, even at high speeds.

An additional second connecting device is advantageously provided, preferably centrally, between the first connecting device, so that an extremely stable three-point connection of the folding top with the motor vehicle is thereby made possible.

The two connecting devices thereby advantageously both have essentially the same distance from the first connecting device.

The locking of the second plug-like element is advantageously carried out, in a first preferred form of implementation, by pneumatic means.

The locking of the plug-like element can, in an alternative manner to this, be carried out in a hydraulically-controlled manner.

The guiding element is advantageously constructed as a tube and has an internal annular space in which an at least partially flexible ring device is positioned, which at least partially encircles a section of the plug-like element if this is inserted into the guiding element, whereby a fluid or gaseous medium, which produces a locking of the section of the plug-like element by means of a pressure stressing or enlargement of the volume of the annular space, is positioned in the interior of the ring device. A secure locking of the plug-like element is hereby advantageously achieved in an extremely simple manner, whereby a rapid detaching again is made possible, with particular advantage, through the relieving of the pressure in the simplest manner, and the folding top can be brought back into a "convertible" position again in a correspondingly simple manner.

It is additionally advantageous that a channel filled with a medium is provided between the first connecting device and the at least one second connecting device, and the control of the locking or the detaching of the plug-like element is carried out by means of pressure stressing or detaching by means of the first connecting device.

In one preferred configuration, the channel is positioned in the wind cowl of the motor vehicle. It is, of course, also possible to position the channel, through a corresponding adjustment of the remaining elements, in the forward edge area of the folding top.

The pressure stressing is advantageously carried out by means of a pressure element, which can be activated by the first connecting device. By that means, the pressure stressing is carried out, or the detaching is made possible upon the removal of the pressure stressing, in a very effective manner and with simple means.

For this, the pressure element advantageously has a plug which can be pressed against the channel and can be activated by means of a lever mechanism of the first connecting device.

The first connecting device is advantageously positioned on the forward transverse support unit of the motor vehicle folding top.

In addition, the first connecting device is, advantageously, a lever mechanism which has an attachment lever, a locking lever connected with the same, as well as a moving lever of the pressure element.

In an alternative form of implementation, the first connecting device is positioned on the wind cowl of the motor vehicle. It can advantageously have a clamp-like hooking device which, by means of rotating, engages with a plug of the folding top and guides this into a locking position and locks it.

The rotation of the hooking device into the locking position can be controlled, in an advantageous manner, by means of an adjusting pinion. This adjusting pinion can be a stepping motor, a hydraulic cylinder, or a pneumatic cylinder, for example.

Furthermore, in an alternative preferred form of implementation, the at least [one] second connecting device has a tubular body which can, by means of an activation device, be moved into a locking- or detaching position of the plug-like element.

The activation device is, in an advantageous manner, a rod which is linked with the hooking device.

The rod of the tubular body can, in an advantageous manner, be moved, through the activation of the rod in a translatory manner, into a locking position or into a detaching position.

Alternatively to this, through a corresponding formation of the tubular body and of the corresponding locking device, the movement into the locking position or detaching position can take place through the rotation of the tubular body.

Figure 2:
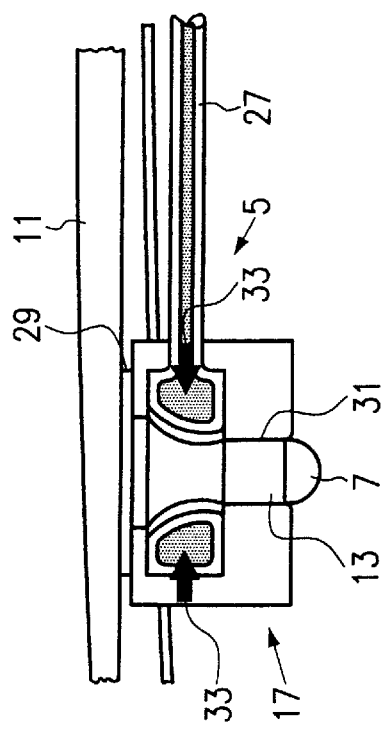
Figure 2:
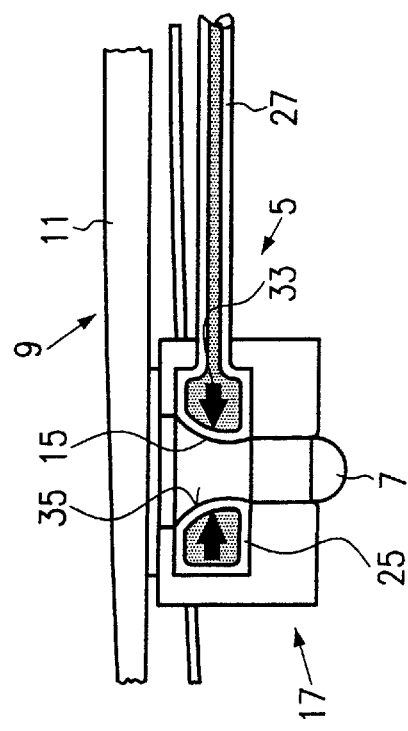
Figure 3:
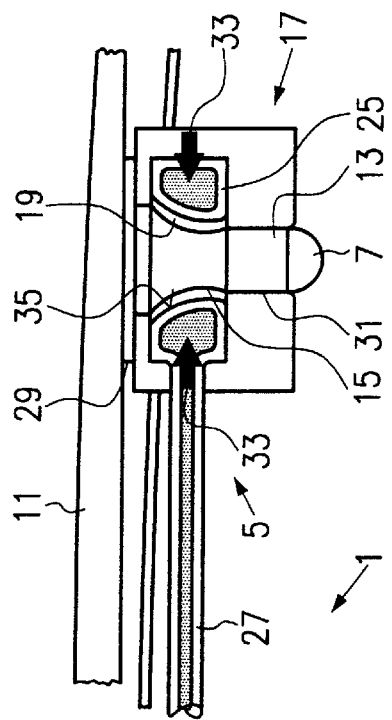
Figure 3:
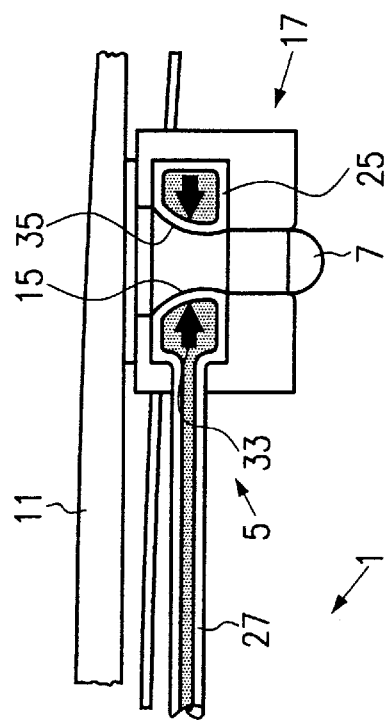
Figure 4:
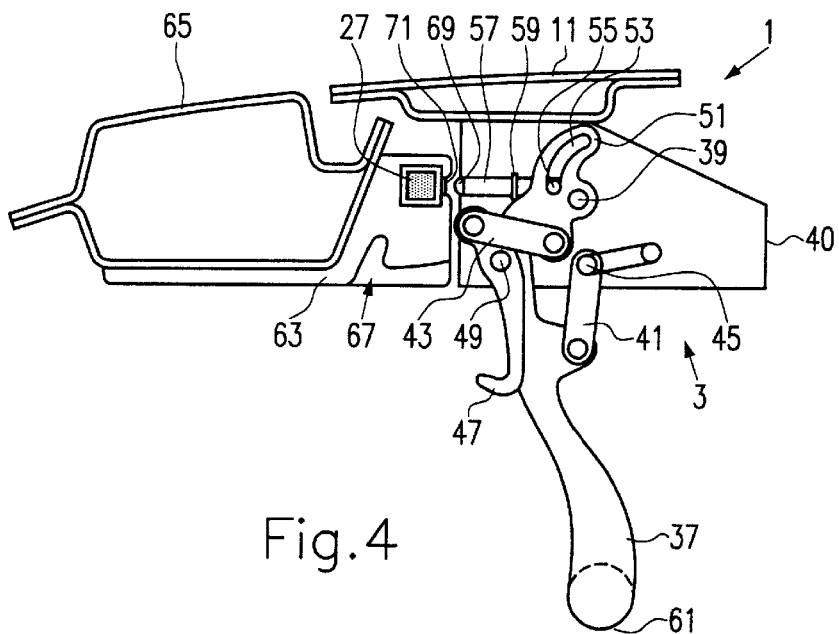
Figure 5:
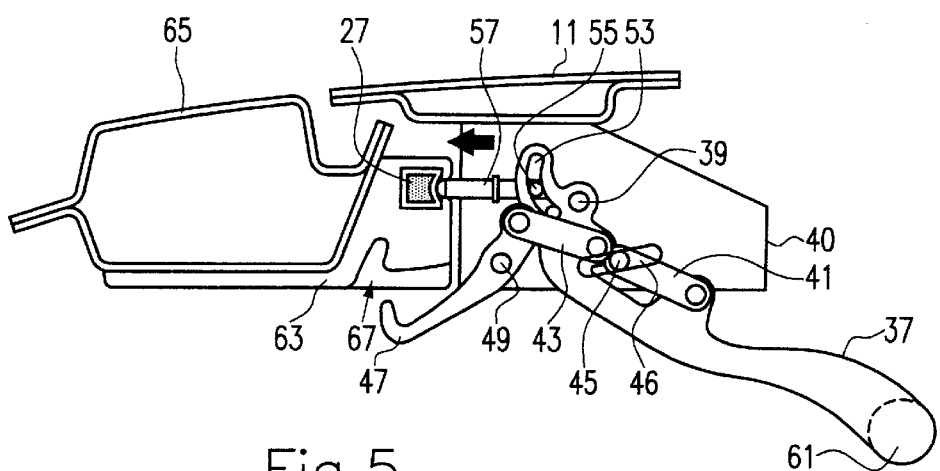
Figure 6:
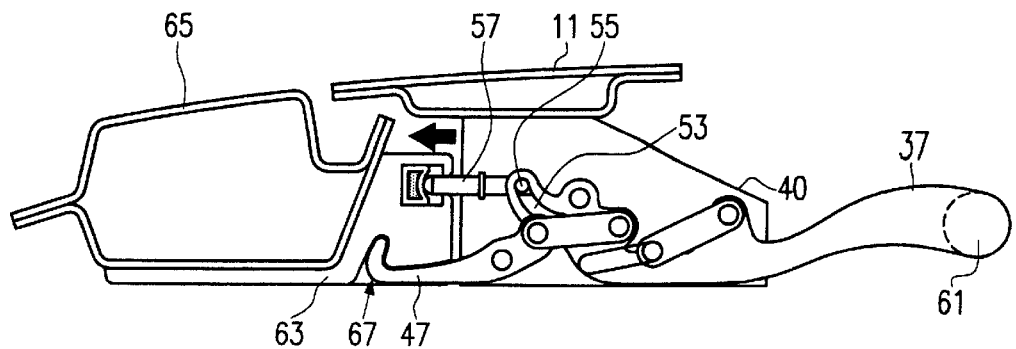

Further details, characteristics, and advantages of the invention result from the following description with reference to the diagrams. These depict the following:

FIG. 1: A schematic representation of two second connecting devices of the locking device in accordance with the invention, in a first form of implementation, in the opened position of the locking device;

FIG. 2: An analogous view to FIG. 1, with the locking device closed, but with the second connecting devices not yet locked, however;

FIG. 3: An analogous view to FIG. 2, but with the second connecting devices locked;

FIG. 4: A schematic, partially cut-away view of one form of implementation of the first connecting device with the locking device in accordance with the invention in the opened position;

FIG. 5: A view analogous to FIG. 4 in an intermediary position between the opened and the closed positions of the first connecting device;

FIG. 6: A view analogous to FIG. 5, but with the first connecting device closed, however;

FIG. 7: A schematic, partially cut-away view of a second preferred form of implementation of the locking device in accordance with the invention, in the opened position;

FIG. 8: A view analogous to FIG. 7, but with the locking device closed, however.

A preferred first form of implementation of the locking device in accordance with the invention will be described in the following under reference to FIGS. 1 to 6.

The locking device in accordance with the invention is designated, in general terms, by the reference number (1). It has a first connecting device (3), which will be described in further detail under reference to FIGS. 4 to 6.

A second connecting device is indicated in FIG. 1 by reference number (5), whereby the locking device (1) which is depicted has, in the example of implementation presented, two second connecting devices (5).

As is evident from FIG. 1, every second connecting device (5) has a plug-like element (7), which is attached to a corresponding element of the motor vehicle folding top (9). This corresponding element may be the forward transverse support unit (11) of the motor vehicle folding top (9), for example. In the example in accordance with FIG. 1, the transverse support unit (11) is only depicted in a partial manner.

The plug-like element (7) has, in the example in accordance with FIG. 1, a cylindrical guide surface (13) and a reduction in area (15) which has, at least in part, a smaller cross-section than the guide surface (13).

The second connecting device (5) has, in a manner correspondingly coordinated with the plug-like element (7), a guiding element (17) which is constructed in an essentially ring-shaped manner and has an internal recess (19) which serves for the accommodation of the plug-like element (7).

The guiding element (17) has, in addition, a locking device (21) for the temporary locking of the plug-like element (7) in the guiding element (17). As is evident from FIG. 1, the locking device (21) is constructed as an essentially ring-shaped body, which is positioned within a corresponding internal recess (23).

In the example which is depicted, the ring-shaped locking device is constructed as an elastically-deformable hollow ring (25) into which a channel (27) discharges. Both the hollow ring (25) as well as the channel (27) are filled with a medium, which may be gaseous or fluid, for example.

In the example which is depicted in FIG. 1, the hollow ring (25) has a cross-sectional surface tapering from the bottom to the top so that, in the unstressed condition, an internal circumference shaped like a truncated cone, which serves for the better insertion of the plug-like element (7), is brought about.

Other circumferential forms, such as cylindrical-, curved shapes, etc., can obviously be used as well.

The second connecting device (5) is depicted in FIG. 2 in a position between the opened position of FIG. 1 and a locking position of the plug-like element (7).

As is evident, the plug-like element (7) is completely inserted into the guiding element (17), so that the transverse support unit (11), which is distanced by a holding plate (29), is applied against the guiding element (17). The guide surface (13) is located in a correspondingly closely-fitting section (31), while the internal recess (19) and the reduction in area (15) still lie free within the internal recess (19).

As indicated by the arrows (33), an increase of volume is brought about within the annular space (25) by means of pressure stressing through the channel (27), as the result of which the internal circumference surface (35) of the hollow ring (25) is flattened out.

Through a further increasing of the pressure or the transport of volume into the hollow ring (25), a partial or even a complete placement of the internal circumference surface (35) of the hollow ring (25) onto the reduction in area (15) of the plug-like element is, finally, brought about as depicted in FIG. 3, so that the plug-like element (7) is thereby locked in the guiding element (17).

A first preferred form of implementation of the first connecting device will now be described in the following with reference to the FIGS. 4 to 6. The first connecting device (3) is, as is evident from FIG. 4, positioned on the upper transverse support unit (11). It has an activation lever (37) which is supported in an articulated manner. The activation lever (37) is supported at an articulation point (39) and in such a manner as to be able to swivel around this. Two articulation elements (41 and 43) are additionally supported in an articulated manner on the activation lever (37), whereby one of the articulation elements (41) in a mounting unit (40) is linked to a longitudinally-movable articulation structure (45). The other articulation element (42) is connected with a locking hook (47) which is, in its turn, attached to the mounting unit (40) at an articulation point (49). The mounting unit (40) is, for its part, attached to the transverse support unit (11).

The activation lever (37) has, in addition, a nose-like projection (51) in which a curved longitudinal aperture (53) is formed. An articulation (55) which serves, for its part, as an articulation link for a pressure element (57) is positioned within the curved longitudinal opening (53). The pressure element (57) is, as depicted in the example of FIG. 4, constructed as a finger-shaped plug. The finger-shaped plug (57) is supported, in a longitudinally movable manner, within a support device (59) which is, for its part, fixed to the mounting unit (40) of the first connecting device (3).

The activation lever (37) can have, at its other end which is placed opposite to the nose-like projection (51), a transverse bracket (61) which has one or, preferably, two projections projecting essentially in parallel to the direction of the transverse support unit, which [projections] facilitate the manual engagement of the activation lever (37) and thereby the activation of the first connecting device (3).

The connecting devise (3) has, in addition, a counter-mounting unit (63), which is positioned on the so-called 'wind cowl' (65) of the motor vehicle. The wind cowl (65) is, for its part, positioned in the upper edge area of the windshield (not depicted) of the motor vehicle.

A hook mounting unit (67), which is complementary in its shape to the locking hook (47), is formed within the counter-mounting unit (63).

In addition, inside this counter-mounting unit (63), the channel (27) proceeds from one of the second connecting devices (5) to the other. A recess (71) is formed in the counter-mounting unit (63) which is positioned opposite to the forward end (69) of the pressure element, so that the engagement of the pressure element (57) with the channel (27) is possible.

The manner of operation of the first connecting device (3) with the corresponding closing mechanism will now be described in the following. Starting from the position in accordance with FIG. 4, the activation lever (37) is, as is depicted in FIG. 5, swivelled around the articulation point (39), and thus in the direction of the rear of the motor vehicle. The articulation element (43) thereby carries along the one end of the locking hook (47), so that the locking hook (47) swivels around the articulation point (49) in the direction of the hook mounting unit (67). The articulation element (41) carries along its movable articulation structure (45), which is able to move within a longitudinal slot (46).

Through the curved longitudinal opening (53), the pressure element or the pressure plug (57) is pressed, by way of the articulation (55), against the channel (27), as the result of which a reduction of the volume is brought about in this area, which leads to an enlargement of the volume of the hollow ring (25) in accordance with FIG. 2.

If the activation lever (37) is, as depicted in FIG. 6, swivelled into its locking position, then the locking hook (47) is positioned, in its engaged locking position, in the hook mounting unit (67) and the pressure element (57) is displaced into its forward-most position: the articulation (55) is positioned at the other end of the curved longitudinal opening (53).

On the basis of the preferably great lever effect through the activation lever (57), a pressure movement which is effective and not of excessively great force can take place within the channel (27), whereby it is simultaneously brought into a locking position. In the locking position in accordance with FIG. 6, the plug-like elements (7) of the second connecting device (5) are then also locked as depicted in FIG. 3.

An alternative form of implementation of the locking device for the motor vehicle folding top system in accordance with the invention will now be described with reference to FIGS. 7 and 8.

As is evident from FIG. 7, the locking device (1) in accordance with the invention has a first connecting device (3) and two second connecting devices (5). A plug-like holding element (75), which comes into engagement with the clamp-like hooking device (77), which is, in its turn, positioned in an articulated manner, by way of an articulation (79) and an mounting unit (80), on the wind cowl (65), where, on the other hand, the plug-like holding element (75) is positioned on the transverse support unit (11) by means of a mounting unit element (81), is provided on the transverse support unit (11).

Both of the second connecting devices (5) have clamp-like elements (81), which can be configured differently from to the plug-like elements (7).

The locking device in accordance with the invention is depicted in FIG. 7 in an opening position, whereby the closing process can proceed from the position which is depicted.

The plug-like elements (81) in accordance with the arrows (83) are, for this purpose, inserted into the tubular guiding elements (85), which have corresponding internal recesses (87). Movable locking bodies (89), which cooperate with at least two spherical locking elements (91), are positioned within the tubular guiding elements.

The spherical locking elements are held in corresponding ring-shaped mounting units (93). The internal mounting unit (87) of the tubular guiding element has a ring aperture (94), into which the spherical locking elements (91) can partially extend.

The cooperation of the first connecting device (3) and of the second connecting device (5) takes place in the following manner.

As is evident from FIG. 7, the plug-like holding element (75) is placed onto the lower arm (78) of the plug-like hooking device (77). The locking of the folding top (9) thereupon takes place in an essentially fully automatic manner.

Through the activation of an adjusting pinion (95), such as of a hydraulic cylinder, for example, the hooking device (77) is swivelled into the counter-clockwise direction. The plug-like holding element (75) thereby comes into engagement with an upper arm (82) of the hooking device (77) and enters into a recess (84) of the hooking device (77).

The end position of the hooking device (77), whereby the plug-like holding element (75) is located in the internal end area of the recess (84), is depicted in FIG. 8. The recess (84) is evidently a locking curvature (86).

In the examples of implementation of an alternative, preferred form of implementation of the locking device (1) in accordance with the invention which are presented in FIGS. 7 and 8, the connection between the first connecting device (3) and both of the second connecting devices (5) is produced by means of connection rods (96), whereby a longitudinal movement of the connection rods (96) is brought about upon the rotation of the hooking device (77).

The connecting rods are supported on the one side in an articulated manner on the hooking element (77), and are connected, on the other side, with the other end by means of displacement elements (97). The displacement elements (97) may be plate-shaped elements, for example, which have a partially curved recess (98) with which a plug (99) of the locking body (89) engages.

The connecting rods (96) are, because of the rotation of the hooking device (77), drawn in the direction towards this, as the result of which the locking bodies (89) in the tubular guiding element (85) are moved in an upward direction. A tapering shaped like a truncated cone (100), which pushes the spherical locking elements (91), during the inward moving up of the locking body (89), into the ring-shaped aperture (94) and into a stop against the plug-like element (7), is provided within the upper section of the locking body (89). It is thereby secured in its position, and an escaping of the plug-like element (7) in an upward direction is thereby prevented.

A detaching of the locking device (1) in accordance with the invention is carried out by activating the adjusting pinion (95) from a retracted position (FIG. 8) into an extended position (FIG. 7), whereby a spring (101), which engages with the mounting unit (80) on the one side and with the hooking device (77) on the other side, is provided for the supporting of the retraction process.

In an alternative manner to the longitudinal movement of the locking bodies (89), it can also be provided to correspondingly rotate these in the tubular guiding element (85), whereby corresponding bearing surfaces are provided, instead of the tapering shaped like a truncated cone (100) which, upon the rotation of the locking body (89), make a movement of the spherical locking elements (91) into the locking position possible. Upon the turning back of the locking bodies (89), the locking position is released again.

A simply constructed locking device for motor vehicle folding tops is consequently created by means of the present invention, which creates a multi-point connection, particularly a three-point connection, of the folding top with the motor vehicle, whereby a particularly stable connection of the folding top with the motor vehicle is achieved, particularly in the area of the powerful air stream which arises at high speeds, so that an extremely cost-favorable and stable locking device is created.

The present invention is not restricted to the examples of implementation which have been depicted. For example, the rotation of the hooking device (77), which is brought about by means of the adjusting pinion (95), can be brought about purely by means of the corresponding activation by the operator. On the other hand, corresponding motor devices can engage with the locking bodies and displace or rotate these in a manner corresponding to their configuration, if the entrance of the plug-like holding element (75) into the recess (84) is detected by means of a corresponding detection device.

What is claimed is:

1. A locking device for motor vehicle folding tops with a first connecting device, which for the fixing of a folding top to the motor vehicle, has a first locking mechanism comprising:
   at least one second connecting device, that is positioned at a distance from the first connecting device, having a plug-like element and a guiding element which is suitable for a mounting unit of the plug-like element;
   wherein the second connecting device has a locking device for the temporary locking of the plug-like element in the guiding element and is connected with a closing mechanism in such a manner that, upon the fixing of the closing mechanism into its closed position, the locking of the plug-like element is carried out at the same time; and
   wherein the second connecting device has a tubular locking body which, by means of an activation device, can be moved into a locking or releasing position of the plug-like element.

2. A locking device in accordance with claim 1, characterized in that, two second connecting devices (5) are provided.

3. A locking device in accordance with claim 2, characterized in that, the two second connecting devices (5) are positioned at essentially the same distance from the first connecting device (3).

4. A locking device in accordance with one of the claim 1, characterized in that, the locking of the plug-like element (7) is controlled by pneumatic means.

5. A locking device in accordance with one of the claim 1, characterized in that, the locking of the plug-like element (7) is controlled by hydraulic means.

6. A locking device in accordance with one of the claim 1, characterized in that, the guiding element (17) is constructed in a tubular manner and has an internal annular space, in which an at least partially flexible ring device (25) is positioned, which at least partially encircles one section (15) of the plug-like element (7), if this is inserted into the guiding element (17) and a fluid or gaseous medium is placed in the interior of the ring device (25), which medium produces, through pressure stressing a locking of the section of the plug-like element (7).

7. A locking device in accordance with one of the claim 1, characterized in that, a channel (27) filled with a medium is provided between the first connecting device (3) and the at least one second connecting device (5), and the control of the locking of the plug-like element (7) is carried out by means of pressure stressing by means of the first connecting device (3).

8. A locking device in accordance with claim 7, characterized in that, the channel (27) is positioned inside the wind cowl (65) of the motor vehicle.

9. A locking device in accordance with claim 7, characterized in that, the pressure stressing is carried out by means of a pressure element (57), which can be activated by the first connecting device (3).

10. A locking device in accordance with claim 9, characterized in that, the pressure element (57) is a plug which can be pressed against the channel (27) and can be activated by means of a lever mechanism (37; 51, 53, 55) of the first connecting device (3).

11. A locking device in accordance with one of the claim 1, characterized in that, the first connecting device is positioned on the forward transverse support unit (11) of the motor vehicle folding top (9).

12. A locking device in accordance with one of the claim 1, characterized in that, the first connecting device (3) has a lever mechanism with an activation lever (37), a locking hook (37) connected with the same, and a movement lever (51, 53) for a pressure element.

13. A locking device in accordance with one of the claim 1, characterized in that, the first connecting device (3) is positioned on the wind cowl (65) of the motor vehicle.

14. A locking device in accordance with claim 13, characterized in that, the first connecting device (3) has a clamp-like hooking device (77) which, by means of rotating, engages with a plug (75) on the folding top and locks in a locking position.

15. A locking device in accordance with claim 14, characterized in that, the rotation of the hooking device (77) into the locking position can be controlled by means of an adjusting cylindrial device (95).

16. A locking device in accordance with claim 1, characterized in that, the activating device is a rod (96) which is linked with the locking body (89) by way of an activating device (97).

17. A locking device in accordance with claim 16, characterized in that, the activation of the rod (96) of the locking bodies (89) can be moved into a locking position or a detaching position by translatory means.

* * * * *